Patented Sept. 7, 1948

2,448,740

UNITED STATES PATENT OFFICE 2,448,740

PROCESS FOR PREPARING STABLE COLLOIDAL SOLUTIONS OF METAL SULFIDES

Fernand Frederic Schwartz, Santiago, Chile

No Drawing. Application October 15, 1945,
Serial No. 622,490

3 Claims. (Cl. 252—313)

This invention relates to a process for the manufacture of stable colloidal solutions of sulphur and of sulphides of arsenic, selenium, molybdenum, antimony, tin, tellurium, platinum and gold, all these elements being capable of forming ammonium thio-salt compounds.

In my U. S. patent application Serial No. 557,230, dated October 4, 1944, (now U. S. Patent No. 2,439,147) there was described the process for preparing colloidal sulphur by the decomposition of an ammonium polysulphide with an aldehyde in the presence or absence of a protecting colloid.

In the present invention I refer to analogous reactions between ammonium polysulphide and ketones such as propione, butyrone, phorone, ascorbinic acid (derived from a pentose, xylose) and others, and also to the decomposition of ammonium thio-salts of As, Se, Mo, Sb, Sn, Te, Pt and Au with aldehydes or ketones in the presence or absence of a protecting colloid, in order to produce colloidal solutions of the sulphides of the above mentioned series.

The reaction between aldehydes and ammonium polysulphides or between aldehydes and ammonium thio-salts produces colloidal sulphur (according to U. S. patent application Serial #557,230, dated October 4, 1944), or the colloidal sulphides of the elements which formed part of the ammonium compounds employed in the reaction.

The product of condensation between an aldehyde and ammonia is hexamethylenetetramine, or aldimine or osimine or other bodies, according to the type of aldehyde intervening in the reaction.

Employing ketones to eliminate the ammonia from ammonium polysulphide, or from the ammonium compounds of the thio-salts, the same above mentioned colloidal solutions are obtained, but the product of condensation with ammonia results in an acetimide or enamine. Should a phorone be employed, for example, the resulting product will be a tri-acetonamine. All these bodies which result from the condensation of ammonia with either aldehydes or ketones are scarcely ionized products and for this reason do not impair the formation or the preservation of the colloids produced, thus preventing the electric load potential of the particles from undergoing any change with time, precluding attraction between the particles and consequently flocculation of the colloid. Colloidal solutions may thus maintain an extraordinary stability.

The reactions between aldehydes or ketones and ammonium thio-salts which produce colloids may be effected in the presence of a protecting colloid which it is convenient to employ with certain aldehydes or ketones. As examples of products which act as protecting colloids the following may be mentioned: proteins, peptones, glues with a starch base and others, methyl-cellulose, dextrine, ammonium alginate, ammoniacal soaps of fatty acids of high molecular weight or resins or combinations of those bodies; also condensation products from some aldehydes and from certain ketones, with ammonia, may act as protecting colloids.

Colloidal sulphur and colloidal solutions of sulphides of the above-mentioned elements, formed by the reactions described are characterized by a high degree of subdivision of the particles and by a stability never attained hitherto. They have every characteristic of the colloids: opalescence, dichroism; they produce the Tyndal effect, have a strong electric charge and the Brownian movements are very vigorous. Their intense chemical activity produces intense biological effects on vegetables, insects, animals and human beings.

*Examples of manufacture*

I

In a mixer provided with double bottom for heating or cooling the products during operation 10 parts of an ammonium polysulphide are mixed with one part of ammonium ricinoleate, or with two parts of an ammonium alginate and, while heating these materials to about 80° C. an aldehyde, as for example acrolein, is added. The ammonium polysulphide is decomposed forming colloidal sulphur and the condensation product which is ammonia acrolein. When all the ammonia smell has disappeared the reaction is considered as ended. The same operation may be effected employing a ketone, as for example forone. In this case the resulting product will be colloidal sulphur and triacetonamine.

II

As an example of manufacture of a colloid based on the elements which are capable of forming sulpho-ammoniacal compounds the preparation of arsenic trisulphide may serve.

In a mixer similar to the one above mentioned, powdered arsenic is dissolved at room temperature in a 30% solution of ammonium sulphohydrate in a 1:5 proportion. To the sulpho-arsenate thus obtained ammonium ricinoleate as a protecting colloid and water are added in the proportion 1:1:1.

The mixture is then decomposed with formalin or phorone until all the ammonia is combined with the aldehyde or ketone employed.

The proportions and quantities mentioned in this specification are only intended to serve as examples of how the manufacture of colloidal sulphur and sulphides of As, Se, Mo, Sb, Sn, Te, Pt and Au in a state of colloidal dispersion may be effected, and it will be apparent that other proportions and the employment of other aldehydes and ketones may give similar results. Also the use of other protecting colloids as, for example, proteinic bodies and their derivatives, gelatine, starch glues, dextrine, methyl-cellulose, solutions of natural and synthetic resin soaps, soaps from different fatty acids, and others may serve for the same object.

I claim:

1. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with a member selected from the group consisting of water-soluble aldehydes and water-soluble ketones.

2. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with a member selected from the group consisting of water-soluble aldehydes and water-soluble ketones in the presence of a protective colloid.

3. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with a water-soluble aldehyde.

4. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with formol.

5. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with a water-soluble ketone.

6. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with phorone.

7. A process for the production of a stable colloidal solution of a metal sulfide, which comprises decomposing a member selected from the group consisting of the ammonium thio-salts of As, Mo, Sb, Sn, Pt and Au, by reacting the same in aqueous solution with a water-soluble aldehyde in the presence of a protective colloid.

8. A process for the production of a stable colloidal solution, which comprises decomposing a member selected from the group consisting of the ammonium thio-salts of As, Mo, Sb, Sn, Pt and Au, by reacting the same in aqueous solution with a water-soluble ketone in the presence of a protective colloid.

FERNAND FREDERIC SCHWARTZ.

REFERENCES CITED

The following references are of record in the file of this patent:

UNITED STATES PATENTS

| Number | Name | Date |
| --- | --- | --- |
| 1,502,285 | Wilson | July 22, 1924 |
| 1,429,522 | Mittasch | Sept. 19, 1922 |
| 1,922,006 | Hoessle | Aug. 6, 1931 |
| 2,060,311 | Hashimoto | Nov. 10, 1936 |
| 2,201,124 | Ehman et al. | May 14, 1940 |

FOREIGN PATENTS

| Number | Country | Date |
| --- | --- | --- |
| 115,236 | Great Britain | Aug. 7, 1919 |
| 353,970 | Great Britain | Aug. 6, 1931 |
| 707,756 | Germany | July 2, 1941 |